R. BEAN.
VEHICLE RAISER.
APPLICATION FILED OCT. 30, 1911.

1,083,182.

Patented Dec. 30, 1913.
4 SHEETS—SHEET 1.

ATTEST
E. M. Fisher
F. C. Mussun

INVENTOR
Roscoe Bean
BY Fisher &Moser ATTYS.

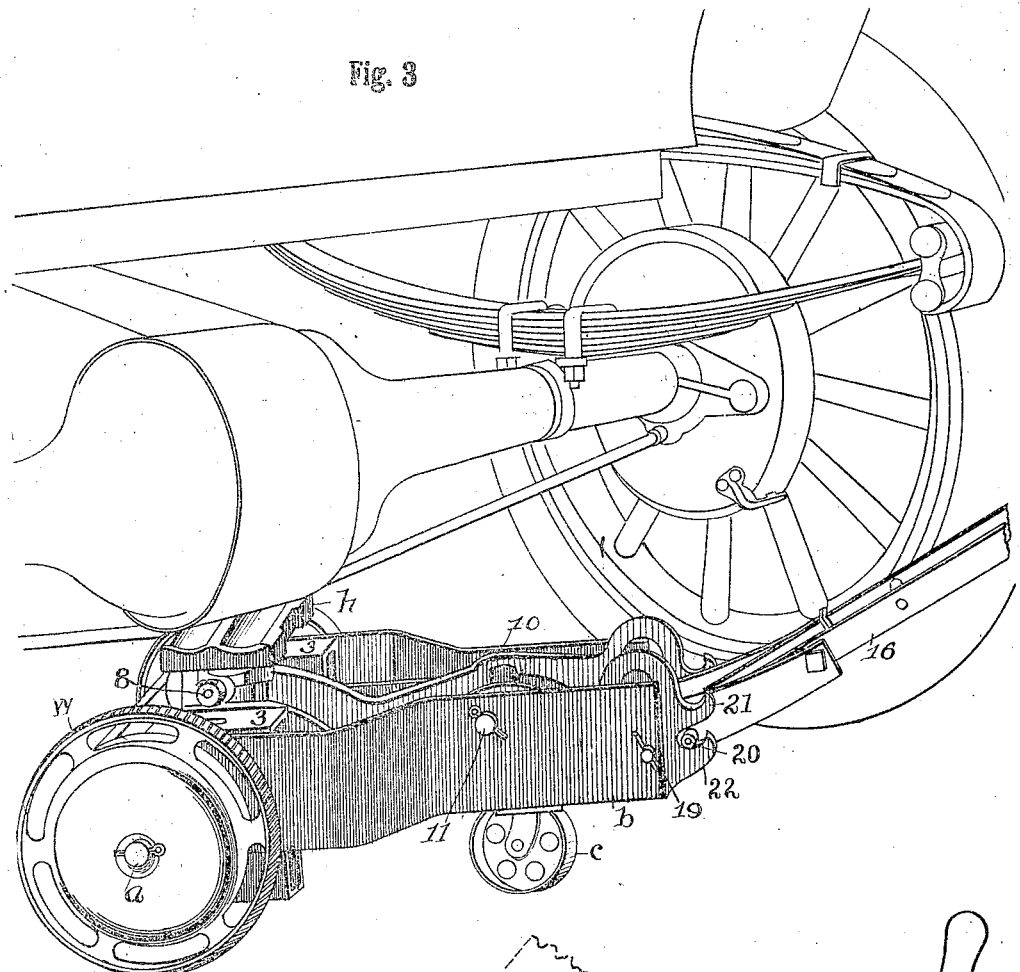
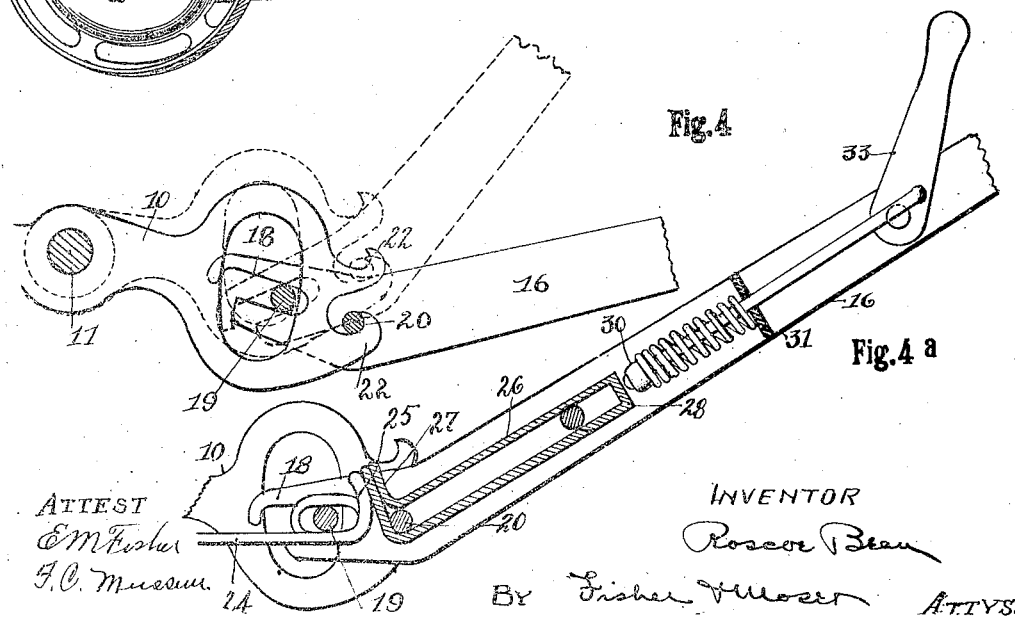

R. BEAN.
VEHICLE RAISER.
APPLICATION FILED OCT. 30, 1911.

1,083,182.

Patented Dec. 30, 1913.
4 SHEETS—SHEET 3.

ATTEST
E. M. Fisher
F. C. Musson

INVENTOR
Roscoe Bean
BY Fisher & Woolf ATTYS.

R. BEAN.
VEHICLE RAISER.
APPLICATION FILED OCT. 30, 1911.

1,083,182.

Patented Dec. 30, 1913.
4 SHEETS—SHEET 4.

UNITED STATES PATENT OFFICE.

ROSCOE BEAN, OF BEREA, OHIO.

VEHICLE-RAISER.

1,083,182.  Specification of Letters Patent.  Patented Dec. 30, 1913.

Application filed October 30, 1911. Serial No. 657,400.

*To all whom it may concern:*

Be it known that I, ROSCOE BEAN, citizen of the United States, residing at Berea, in the county of Cuyahoga and State of Ohio, have invented certain new and useful Improvements in Vehicle-Raisers, of which the following is a specification.

This invention relates to the class of devices known as vehicle raisers, and has especial adaptability to automobiles and auto trucks, all substantially as shown and described and particularly pointed out in the claims.

Figure 1:
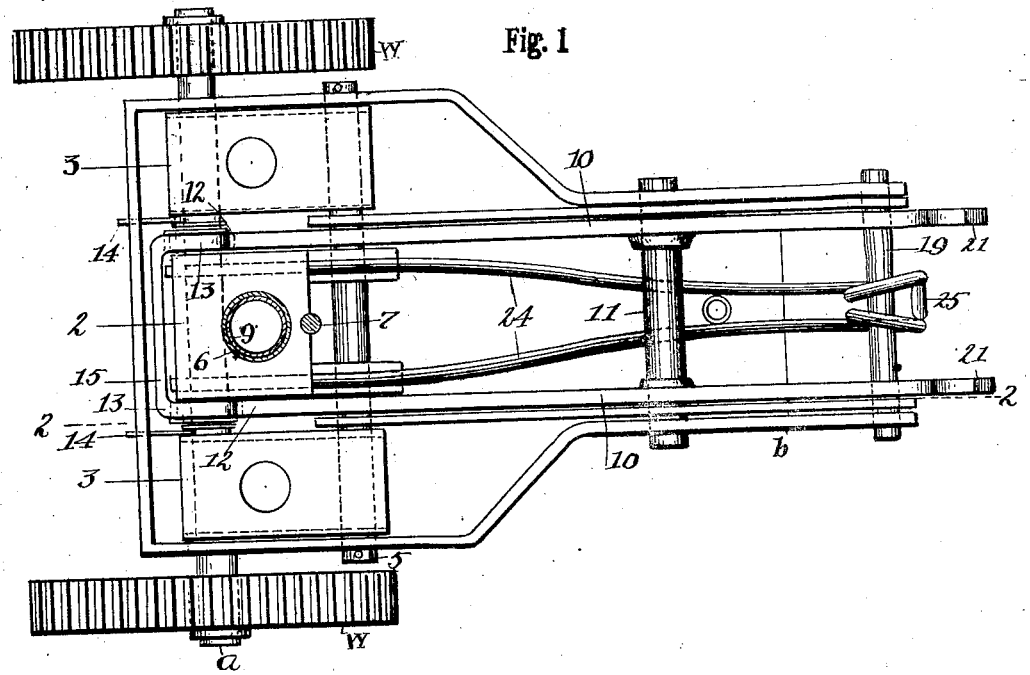
Figure 2:
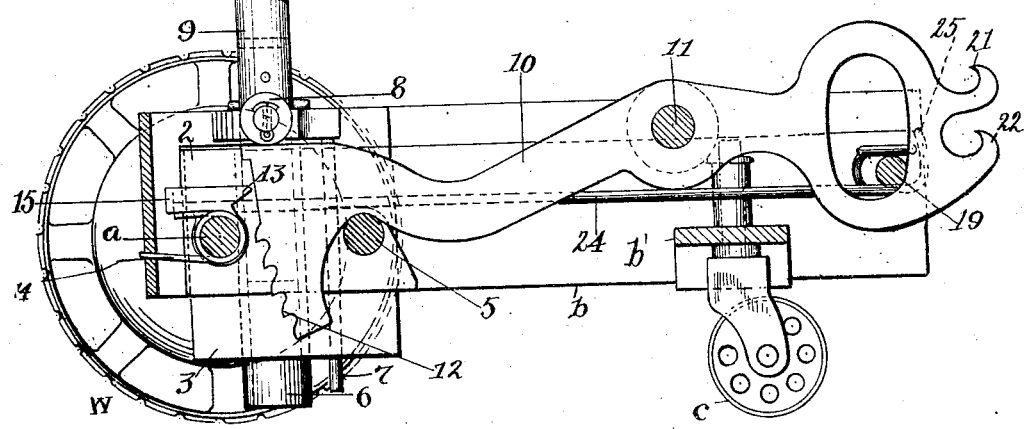
Figure 5:
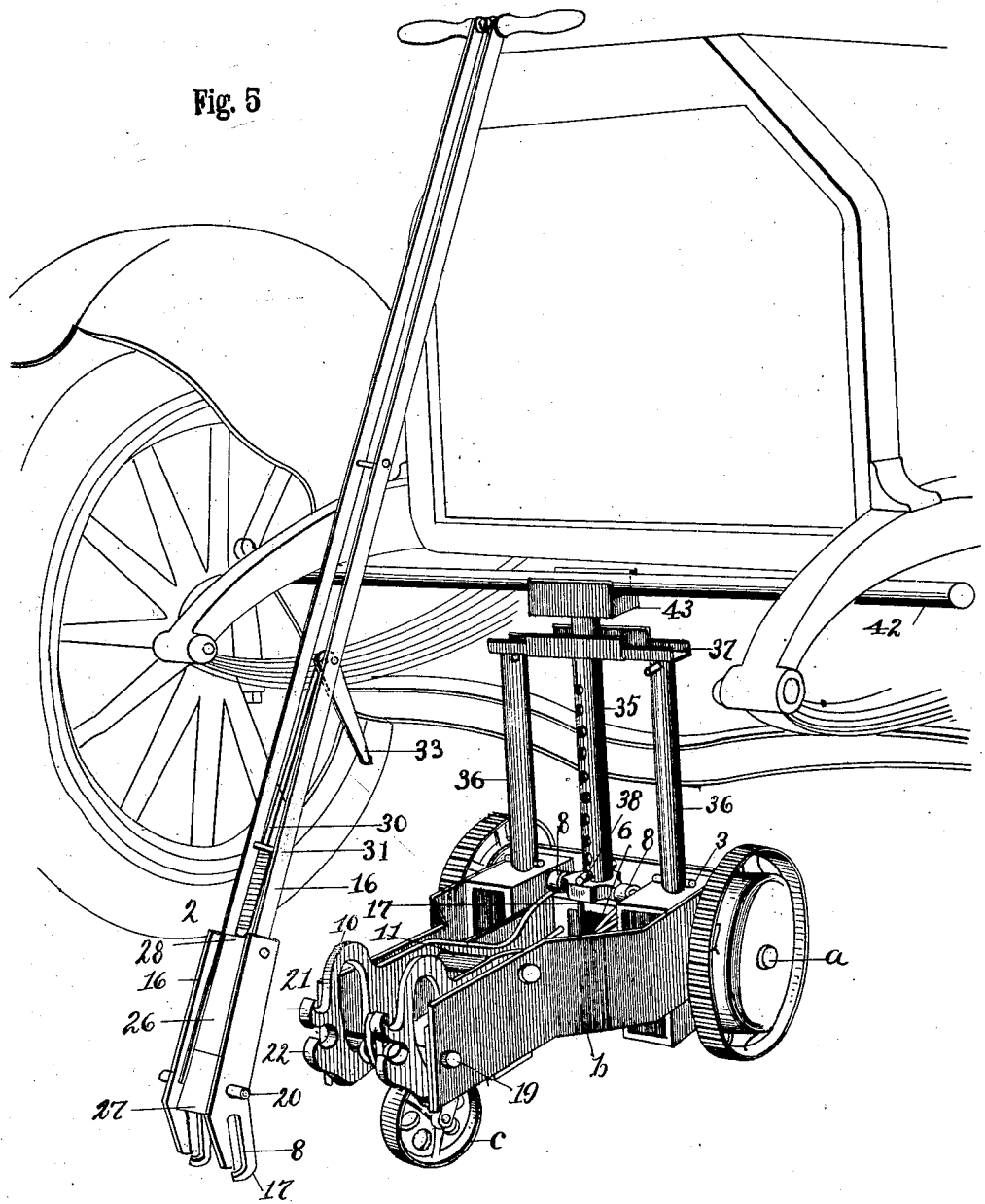
Figure 6:
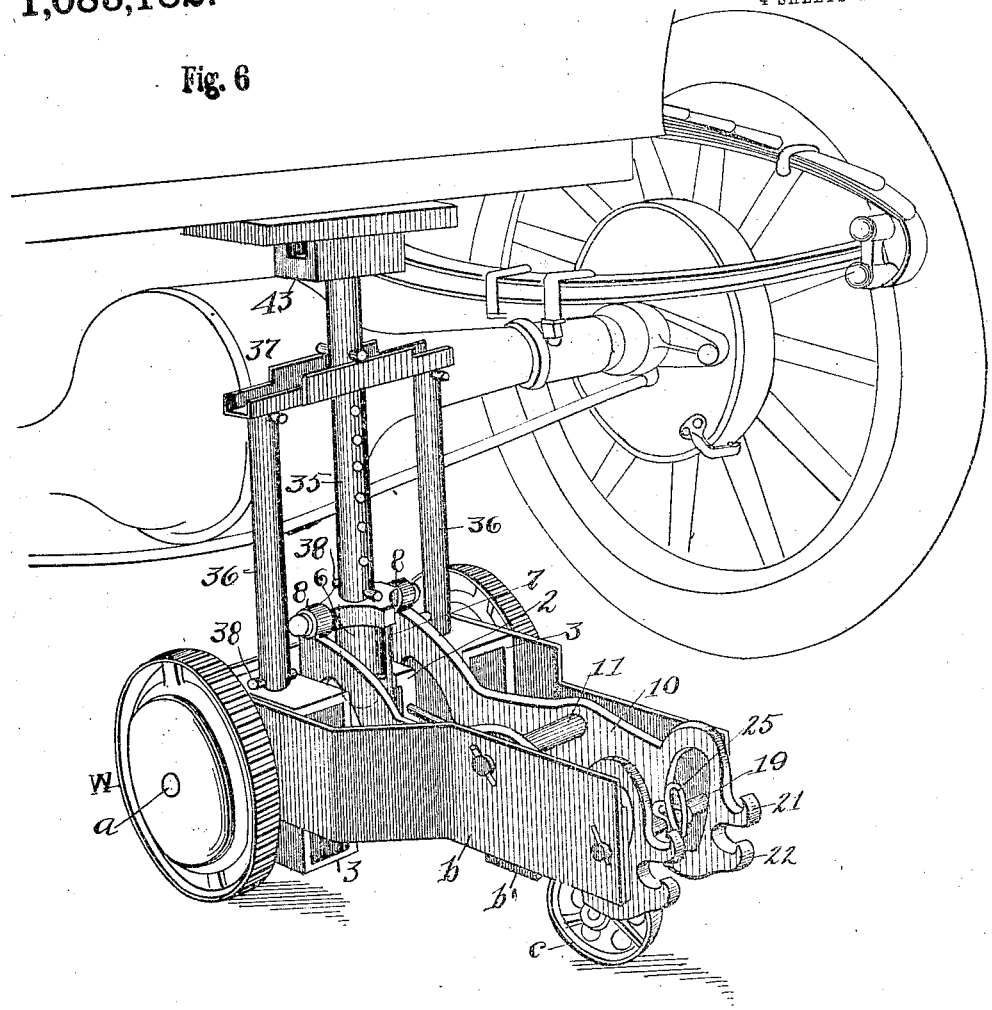
Figure 7:
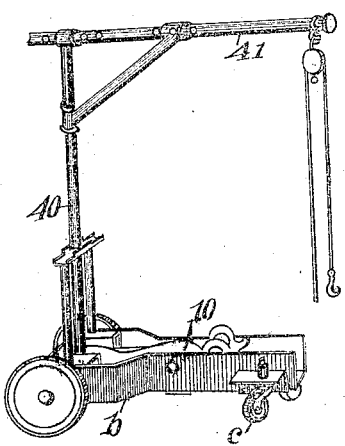

In the accompanying drawings, Figure 1 is a plan view of the device without the hand lever, and Fig. 2 is a sectional elevation of Fig. 1 on a line corresponding to 2—2, Fig. 1. Fig. 3 is a perspective view of the rear of an auto showing my raising device beneath the middle of the rear axle and adapted to raise the auto so that the wheels or tires can be removed and, if necessary, move the rear of the auto bodily to either side by moving the truck on its wheels. Fig. 4 is a side elevation of the front portion of the device and the hand lever engaged therewith. Fig. 4ª shows the means for unlocking the pawls. Fig. 5 is a perspective view of the front end of an auto and my raising device beneath a cross portion of the body or frame, thus enabling a spring or broken leaf to be removed and replaced and the wheels taken off if desired. This involves standards which bring the lift to a higher level than in Fig. 3, as hereinafter described. Fig. 6 shows the device adapted to operate as in Fig. 5 but positioned in lifting relation beneath the rear of an auto body and whereby the rear wheels and axle and other parts may be removed. Fig. 7 is a perspective view of the device with a crane extension or attachment, as hereinafter fully described.

The device as thus shown is essentially of the truck pattern and has the function of supporting and moving the vehicle bodily or at either end or at both ends if two devices be used, and this can be done with one or more of the wheels removed for repair or other purposes. However, the device is first of all a vehicle raiser and adapted to be used in lieu of an ordinary lift jack in many instances but also and especially where a lift jack is unavailable because it cannot be operated therein. This occurs particularly beneath machines and where the lifting means must be applied in places where jacks cannot possibly be operated. This accounts in a measure for the comparatively long body of the present device which enables the immediate lifting portion to be run under the machine wherever it is wanted and to have its end available outside to apply the lifting power. Then again this device is especially constructed to work on different levels which are a considerable distance apart, such, for example, as illustrated in Figs. 3 and 6, there being interchangeable parts provided for such cases. Finally the device is convertible into a combined crane and truck for bodily transporting some heavy part of an auto, such as the engine or cylinders to any part of a garage or factory. Now, having this view into the character and uses of the device, the details comprise a substantially flat sided body $b$ formed in one piece as shown herein and having a cross connecting portion $b'$ at its bottom and front. This body or frame is supported on a suitably heavy axle $a$ and two wheels $w$ at its rear and a caster $c$ at its front having its spindle centrally in the said cross portion $b'$ of the main frame but curved at its bottom to give the caster the usual swivel movement. The frame $b$ may be cast or made of heavy rolled plate bent into shape and any equivalent construction of frame or body may be used. The mechanism within the said frame and which has to do with the lifting or raising operation comprises, first, a central box 2 and side boxes 3, or their equivalent, which are fixed rigidly in the said frame by means of the axle $a$ and a cross rod 5 passing through holes in opposite sides of said boxes and through which construction the said boxes are practically made a part of the frame proper.

I use boxes because they are light as to weight and yet strong, but otherwise could use solid blocks of the same depth or their equivalent. The said boxes have central vertical holes extending through the same and affording bearings of the requisite depth for the vertically disposed lift standards adapted to occupy said holes. There may be several of these standards according to the holes they are to occupy and the elevation to be reached and whether used in the central or side holes, and are of varying sizes and lengths and in some instances adapted to sleeve one upon or within the other according to the work to be done. However, and in any case they are or become lift standards or members by reason of similarity of use and means of operation applied thereto and may be regarded as the same element or part in this description and the claims unless otherwise expressly defined. For example, in Fig. 5 I show a tube 6 seated in the hole in the central box 2 and adapted to extend beneath the same relatively as seen in Fig. 2 so as to provide a bearing of still greater depth than said box and having a head with lateral extensions carrying rollers 8. Suitable means such as tilting lift levers 10, should also be provided to insure the direct upward lift of the said tube 6 and to prevent its axial rotation, and in this instance I show a guide rod 7 attached to the head thereof and dropping down at the outside through guide notches or holes in the edges of box 2. These or equivalent means may be employed for this purpose, and the said tube becomes the secondary lift member, the levers 10 being the primary members and always used whether the middle tubes or the side tubes be employed. Now, to these ends the said lift levers are made and applied as separate members but operated and serve as a unit for lifting a load, and are pivoted on a cross rod or support 11 through their outer end portions and through the sides of the main frame and come within said sides and between the central box 2 and the side boxes 3, where they have plenty of room for vertical play within working limits. In point of construction said levers have substantially sector shaped inner ends with ratchet teeth 12 adapted to be engaged by pawls 13 pivoted on the axle $a$ and pressed by springs 14 into engagement with said ratchets or ratchet teeth. A yoke 15 connects the said pawls across their back and serves to withdraw the same from engagement when it is desired to lower the said levers, it being now understood that the pawls engage the levers and hold them until released and that the lift of the levers is imparted to the tube 6 and its load through the said rollers 8. Operation of the said lift levers is through what is herein termed a hand lever 16. This lever is made preferably with two side pieces spaced apart between their ends and provided with what are termed pivot jaws 17 fixed rigidly upon its lower end and forming a part thereof and provided with inclined slots 18 open at their lower extremities to engage upon a cross rod 19 fixed in the sides of the main frame. A cross pin 20 or its equivalent is fixed through said jaws above said slots and projects laterally at the sides thereof to provide pivots adapted to rest in the open hook shaped bearings 21 and 22 respectively in the outer ends of the lift levers 10. These bearings are at different elevations and lengths, the lower bearings being shorter and hence nearer the fulcrum rod or part 19 than the bearings 21 and hence affording more leverage for heavy loads. The said lever 16 is free to be engaged in either of said sets of bearings and to be bodily detached, and a single lever or handle will serve the purposes of several of these devices in the same garage if more than one device is used. Means for releasing the said pawls 13 consist in this instance in a suitably heavy wire which has side stems 24 and loose coils about the cross rod 19 and an upwardly bent tongue 25 at its middle and front, the said wire being adapted to be thrust back through holes in the sides of box 2 and in position to bear against the inside of yoke 15 to press it rearward and thus release the said pawls. The hand lever 16 is provided with means to operate said wire, said means consisting in a slide 26 mounted between the jaws 17 and having ends 27 and 28 respectively, the upturned end or face 27 being adapted to bear against said spring tongue 25 and the end 28 to be engaged by the end of a rod or heavy wire 30. The said rod is slidably supported at its lower portion in a web 31 in lever 16 and carries a spiral wire spring about the same bearing at one end against said web and attached at the other to said rod and adapted to throw the rod down against the end of slide 26 and through said slide and the wire 24 move the pawls 13 back out of engagement with levers 10. Otherwise the said sliding rod 30 is connected eccentrically at its upper end with a small lever 33 on hand lever 16 and by which said rod can be drawn upward out of working engagement with said slide. This takes pressure off the yoke connecting the pawls and permits their springs 14 to act and hold them in engaging position on the said lift levers 10. When thus engaged the said levers carry the superposed load whatever it may be, and hand lever 16 can be removed as shown for example in Fig. 5.

The secondary lift member represented by tube 6 is always used, but it depends on the work to be done as to what other parts work with it. Thus, in Fig. 2 I show a tube 9 therein having a cushioned or lined head $h$ adapted to be used say as seen in Fig. 3, but in Fig. 6 I show a central standard or tube 35 of much greater length than tube 9 and which is supplemented by side standards 36 through the respective side boxes 3 beneath and all connected by a cross piece 37 at their top and adapted to serve with a bracing effect upon the central standard 35. In this case the several standards or tubes are provided with holes through the same at intervals and pins 38 through said holes and whereby their initial or starting position may be fixed prior to applying the lift mechanism and the pins be inserted to hold the load at any elevation. Or the central standard 40 shown in Fig. 7 may be substituted for standard 35, and in this view I show a horizontal arm 41 on which I can employ any suitable hoist mechanism.

It should have been noted as material that the body or frame b is narrowed in its front portion to about half its full width at its other end and that the weight of the load comes upon the rear wheels through axle a and which leaves the front end free to be turned on its caster. This construction of frame is material on account of the usual lack of room in a garage and for the more convenient handling of the truck.

It will be seen that the truck itself is in fact a complete article when equipped with the lift mechanism as shown, and that the hand lever for operating the lift is also a separate member but adapted to be used exclusively with said mechanism.

The details of each part have been described but these may be more or less varied without departing from the spirit of the invention. It will be noticed that the lift levers have straight upper portions which engage beneath the rollers, 8, and are free to swing on their pivot 11 but are limited in their drop at the rear by cross rod 5. The longer portions of said levers are behind the pivot 11, so as to get a comparatively long lift with a materially less movement at the front. This short movement is utilized to gain lifting power by fulcruming the hand lever on cross rod 19 and seating the projecting pin 20 in either of the two hooks 21 or 22. The advantages of this arrangement are many, but possibly the greatest is that the vertical lift standards may be positively actuated with ease and certainty at a point considerably removed from their center of rest beneath the load, and by mechanism intermediate the hand lever and the lift standards which takes up but little vertical room so that it may clear all intervening obstructions. Briefly the device may be placed in cramped quarters and beneath overhanging parts and still give perfect freedom of play of the hand lever outside of the zone of lift engagement. The hand-lever may also be shifted from one set of hooks to the other without disengaging the slotted extremities from cross rod 19, and this is of advantage in giving the operator an immediate shift of fulcrum without resorting to a change of levers of different length, or re-positioning of the lift standards beneath the load. In Fig. 5 I show an independent iron bar 42 seated in the recessed head 43 of standard 35, and the ends of this bar extend beneath the chassis frame of the car to support the same and remove the weight of the car from the springs which may then be replaced or repaired. By using the telescopic standard 35 and its pins 38 I may also lift the car to a greater height than by the primary lift levers 10 alone. Thus the latter may be tilted by the hand lever to their maximum, and the pawls will sustain the parts in this position. Then a pin 38 may be inserted through one of the openings in standard 35 above cross piece 37 (see Fig. 6) to sustain the load during the interval when tube 6 is permitted to drop and a similar pin 38 placed through the lowermost exposed opening in standard 35 to repeat the lift operation by a second operation of the hand lever and the lift levers.

In this device no tilting of the frame from a strut or like member is resorted to, and caster c serves the same function as wheels w to provide a rolling support for the frame. The maximum movements of the hand lever also have no tilting effect on the frame or body of the device, and may even be removed or detached after the load is elevated, a feature of advantage as it permits the body of the device to turn and roll about the vertical axis represented by tube 6 when the car, which it supports, is being shifted from place to place in the garage, said device taking the place of the wheels now either entirely removed or else raised free above the floor.

What I claim is:

1. In a vehicle raiser, a truck and a pair of levers pivoted in the sides thereof and provided with teeth in their rear edges, pawls to engage said teeth and a lift member having lateral projections engaged by said levers respectively.

2. In vehicle raisers, a truck and lift levers pivotally mounted thereon and provided with teeth at their rear, connected pawls engaging said teeth and a thrust device adapted to hold said pawls out of engagement.

3. In vehicle raisers, a truck and a pair of lift levers mounted in the sides thereof and having ratchet teeth in their rear edges, pawls for said levers and a yoke connecting the same, a device adapted to engage said yoke and release said pawls and a hand lever adapted to operate the said device.

4. In vehicle raisers, a truck having rear side wheels and a front caster wheel and a support in its rear having a hole through its center vertically, in combination with a lift device having a spindle engaged in said hole and provided with a head, pivoted lift levers engaged beneath said head and a hand lever operatively engaged with the ends of said lift levers.

5. In vehicle raisers, a truck frame permanently mounted on wheels and a pair of lift levers pivoted between their ends in the sides of said frame, in combination with a lift member operatively engaged by the inner ends of both said levers and a removable hand-lever having a stationary pivot in said frame and having side projections engaging the corresponding ends of both said lift levers and in extension thereof.

6. In vehicle raisers, a truck frame on wheels and lift mechanism mounted therein comprising two levers pivoted within the side of said frame and provided each with ratchet teeth on their inner ends and open bearings at their outer ends, a vertically slidable lift member supported on the inner ends of said levers and pawls to engage said teeth and lock said levers in successive positions.

7. In vehicle raisers, a truck, a pair of lift levers pivoted therein between their ends and provided with substantially sector shaped extremities having teeth and means to engage said teeth and hold the said levers in adjusted position, in combination with a lift member having lateral extensions at its top resting on said levers and a hand-lever removably connected with the outer ends of said levers.

8. In vehicle raisers, a truck frame and a pair of levers pivoted therein, a lift member having lateral projections at its top resting on said levers and a second member sleeved in said lift member and provided with a sustaining head adapted to engage the vehicle, in combination with a detachable hand-lever constructed to operatively engage both said levers and the said truck frame.

9. In vehicle raisers, a truck having a central fixed bearing, a tubular lift member slidably mounted in said bearing and having a head at its top, a pair of lift levers engaging beneath said head and adapted to raise said lift member, said levers being independently pivoted between their ends, and a hand-lever having a head adapted to engage both said lift levers.

10. In a vehicle raiser, a wheeled truck and levers pivoted therein between their ends, pawls connected rigidly by a yoke adapted to engage said levers and means to disengage said pawls comprising a push device operated from the front of said truck and engaging said yoke.

11. In vehicle raisers, a truck frame having roller supports and a bearing at its center and rear, in combination with a tubular lift member slidably mounted in said bearing and having lateral projections at its sides, and a lift standard slidable in said lift member, in combination with a pair of lift levers engaging said lateral projections and pivoted within the said frame, and a separate hand lever engaged with the said lift levers and fulcrumed on the said frame.

12. A vehicle raiser consisting of a truck on wheels, lift devices in said truck comprising unitary lift levers having ratchet teeth on their inner ends and a set of connected pawls engaging said teeth, in combination with a hand lever detachably engaged with said levers and operatively connected means in said lift levers and said hand levers to release said pawls.

13. In a vehicle raiser, an elongated truck body having wheels, a lift device lengthwise thereof pivoted between the sides of said body and a slidably mounted lift standard in the inner portion of said body, in combination with a hand lever removably fulcrumed on said body and operatively engaged with the outer end of said lift device.

14. A vehicle raiser comprising an elongated truck frame and a lift standard slidably mounted centrally in the inner end of said frame, a lift lever pivoted between the sides of said frame in its outer portion operatively engaging said standard and adapted to impart lift movement thereto, and a separate handle to operate said lift lever fulcrumed on the sides of said frame and having projections engaged in said lift lever.

15. A device of the kind described, comprising a frame on wheels, a pair of lift levers lengthwise within the sides of said frame and a vertically slidable lift standard at one end of said frame engaged at its sides by said lift means, in combination with a hand-lever having lateral projections in engagement with said lift levers and fulcrumed on the said frame, the said lift levers having a fixed pivot in said frame and constructed to engage on opposite sides of said lift standard.

16. A vehicle raiser having a frame mounted on wheels and a set of lift members telescoped one within the other at the inner end thereof, the lower of said members having a laterally extending head, in combination with a tilting device engaging said head, an operating hand lever detachably engaged with both said frame and said tilting device and pawl and ratchet mechanism to support said tilting device as it is raised.

17. A vehicle lifting device comprising an elongated frame having wheels at its inner end and a caster at its outer end, a lift member slidably mounted in said frame and having side projections at its top, horizontally arranged levers pivotally mounted in said frame and engaged beneath said projections and a hand power lever pivoted on said frame and operatively engaged with said levers, in combination with a separate lift member adjustably mounted in said vertical lift member and means to take up the adjustments thereof.

18. A truck having a lift member at one end and devices to operate said member having sets of bearings at different elevations at their outer end, in combination with a hand-lever pivoted on said truck and having working engagement with either one or the other of said sets of bearings.

19. A vehicle raiser having a frame and lift mechanism pivotally mounted in said frame and having open bearings in its outer end, in combination with a detachable hand-lever having open slots fulcrumed on said frame and side projections adapted to engage in said open bearings.

20. A wheeled truck having a tubular lift member slidably mounted therein and a lift standard adjustable in said lift member, in combination with power compounding means comprising two lift-levers engaged at one end on opposite sides of said lift member, and a detachable hand-lever fulcrumed upon said truck and operatively engaged with the outer ends of the said levers as an extension thereof in substantially the same horizontal plane.

21. A wheeled truck having a transverse pivot at its outer end for a lever and a movable lift member mounted in the inner end of said truck, levers to raise said lift member and a locking device adapted to engage said levers and hold said member in raised position, in combination with a hand-lever detachably fulcrumed on said transverse pivot and constructed to operatively engage said levers at different elevations.

22. In a vehicle raiser, a truck and lift mechanism therein comprising a lift lever, a hand lever removably fulcrumed on the other end of said truck, and said lift lever having a plurality of bearings at different distances from the fulcrum of said hand lever and adapted to be engaged by said lever in one or the other according to the weight to be raised.

23. In a vehicle raiser, a truck frame having a central vertical bearing and two side bearings in its inner end, in combination with a standard in each of said bearings, and a cross piece connecting the tops of the two side standards having an opening through which the middle standard projects and which serves as a guide therefor.

24. In vehicle raisers, a truck frame having supporting wheels at its sides and inner end and a caster at its front end and three several bearings substantially in line with said wheels and having vertical openings, standards in said openings and a cross piece connecting the upper ends of the two side standards having a hole in its middle for the middle standard, in combination with means to raise said middle standard independently of the side standards.

25. A truck frame on wheels with a caster support at its front, a tubular lift member slidable vertically in said frame and adapted to carry a load, in combination with actuating means for said lift member comprising two similar levers having the front portions thereof substantially coincident with the front end of said frame and mounted on a common pivot transversely disposed in said frame and a handle member adapted to engage at opposite sides of said frame and to bear on the otherwise free outer ends of said levers.

26. A vehicle raiser consisting of a truck frame on wheels and a lift member vertically movable therein, actuating means for said lift member extending between the same and the front end of said frame and a lock to engage said lift member and hold the same at different elevations, in combination with a hand controlled lever removably engaged with the front of said frame and the said means, and mechanism adapted to release said lock having the initial parts thereof mounted on said handle.

In testimony whereof I affix my signature in presence of two witnesses.

ROSCOE BEAN.

Witnesses:
E. M. FISHER,
F. C. MUSSUN.